(12) United States Patent
Widergren

(10) Patent No.: US 7,508,943 B2
(45) Date of Patent: Mar. 24, 2009

(54) MULTIMEDIA STORAGE SYSTEMS AND METHODS

(75) Inventor: Robert D. Widergren, Morgan Hill, CA (US)

(73) Assignee: MO-DV, Inc., Campbell, CA (US)

( * ) Notice: Subject to any disclaimer, the term of this patent is extended or adjusted under 35 U.S.C. 154(b) by 616 days.

(21) Appl. No.: 10/848,224

(22) Filed: May 17, 2004

(65) Prior Publication Data

US 2004/0228169 A1  Nov. 18, 2004

Related U.S. Application Data

(60) Provisional application No. 60/502,851, filed on Sep. 12, 2003, provisional application No. 60/471,151, filed on May 16, 2003.

(51) Int. Cl.
*H04N 7/167* (2006.01)

(52) U.S. Cl. ........................................ 380/239; 370/397

(58) Field of Classification Search ................. 713/189, 713/193, 194; 709/220, 223
See application file for complete search history.

(56) References Cited

U.S. PATENT DOCUMENTS

| | | | | | |
|---|---|---|---|---|---|
| 5,584,023 | A | * | 12/1996 | Hsu | 707/204 |
| 5,812,204 | A | * | 9/1998 | Baker et al. | 348/453 |
| 5,923,757 | A | * | 7/1999 | Hocker et al. | 345/156 |
| 5,940,506 | A | * | 8/1999 | Chang et al. | 713/189 |
| 6,041,386 | A | * | 3/2000 | Bello | 711/4 |
| 6,052,711 | A | * | 4/2000 | Gish | 709/203 |
| 6,079,047 | A | * | 6/2000 | Cotugno et al. | 714/807 |
| 6,233,347 | B1 | * | 5/2001 | Chen et al. | 382/100 |
| 6,240,184 | B1 | * | 5/2001 | Huynh et al. | 380/206 |
| 6,295,645 | B1 | * | 9/2001 | Brewer | 717/178 |
| 6,396,937 | B2 | * | 5/2002 | Chen et al. | 382/100 |
| 6,400,826 | B1 | * | 6/2002 | Chen et al. | 382/100 |
| 6,499,056 | B1 | * | 12/2002 | Kitamura et al. | 709/213 |
| 6,590,604 | B1 | * | 7/2003 | Tucker et al. | 348/14.13 |
| 6,735,676 | B1 | * | 5/2004 | Kanda et al. | 711/147 |
| 6,820,055 | B2 | * | 11/2004 | Saindon et al. | 704/235 |
| 7,009,655 | B2 | * | 3/2006 | Huang | 348/441 |
| 7,295,608 | B2 | * | 11/2007 | Reynolds et al. | 375/240.01 |
| 2002/0025141 | A1 | | 2/2002 | Matsumoto et al. | |
| 2004/0052233 | A1 | | 3/2004 | Skog et al. | |
| 2007/0008422 | A1 | * | 1/2007 | Huang | 348/441 |

OTHER PUBLICATIONS

Toshiba Press Release; Toshiba's SD-Card-Based Digital Rights Management System Open up Full Potential of Digital Content Distribution Market; Jul. 17, 2003.

* cited by examiner

*Primary Examiner*—Kambiz Zand
*Assistant Examiner*—Dant B Shaifer Harriman
(74) *Attorney, Agent, or Firm*—Morgan, Lewis & Bockius LLP

(57) ABSTRACT

An article of manufacture includes a machine-readable medium that stores a multimedia content file in a first format and multiple program sets. Each program set is a version of software that, when executed by a respective electronic system, produces the multimedia content file in a second format for use in the respective electronic system. A first program set is compatible with a first operating system executed by a first electronic system and a second program set is compatible with a second operating system executed by a second electronic system. The second operating system is distinct from the first operating system.

29 Claims, 3 Drawing Sheets

MULTIMEDIA STORAGE SYSTEMS AND METHODS

CROSS REFERENCE TO RELATED APPLICATIONS

The present application claims priority from U.S. Provisional Application 60/471,151, filed May 16, 2003, and U.S. Provisional Application 60/502,851, filed Sep. 12, 2003, each of which is incorporated herein by reference.

BACKGROUND

Multimedia cards (MMCs) and other storage card formats are well known today as a means of providing external memory capacity for storing information of interest to a user. Such cards are used principally in handheld devices, such as digital cameras, cell phones and personal digital assistants (PDAs).

A disadvantage associated with these cards is their reliance on the software loaded in the handheld device to process (e.g., decode, expand, etc.) the content (e.g., digital photographs, video games, etc.) that the cards contain. Such processing programs must be in the memory of the handheld device to which the cards are attached. This means that the handheld device must have sufficient memory to retain the processing program. It also means that the handheld device must have a processing program capable of decoding/decrypting the particular encoding/encryption format of the content in the card.

SUMMARY OF THE INVENTION

According to an embodiment of the invention, an article of manufacture includes a machine-readable medium. The medium has stored thereon a first data set in a first format and a second data set that when executed by an electronic system is operable to produce the first data set in a second format.

DETAILED DESCRIPTION

An embodiment of the present invention enables many different devices to present a non-compressed, compressed, expanded and/or encrypted multimedia file stored on a single-format storage device. This may be achieved by storing the multimedia file, along with the player/decoder and/or decryption programs required to process the file, on the same device.

Figure 1:
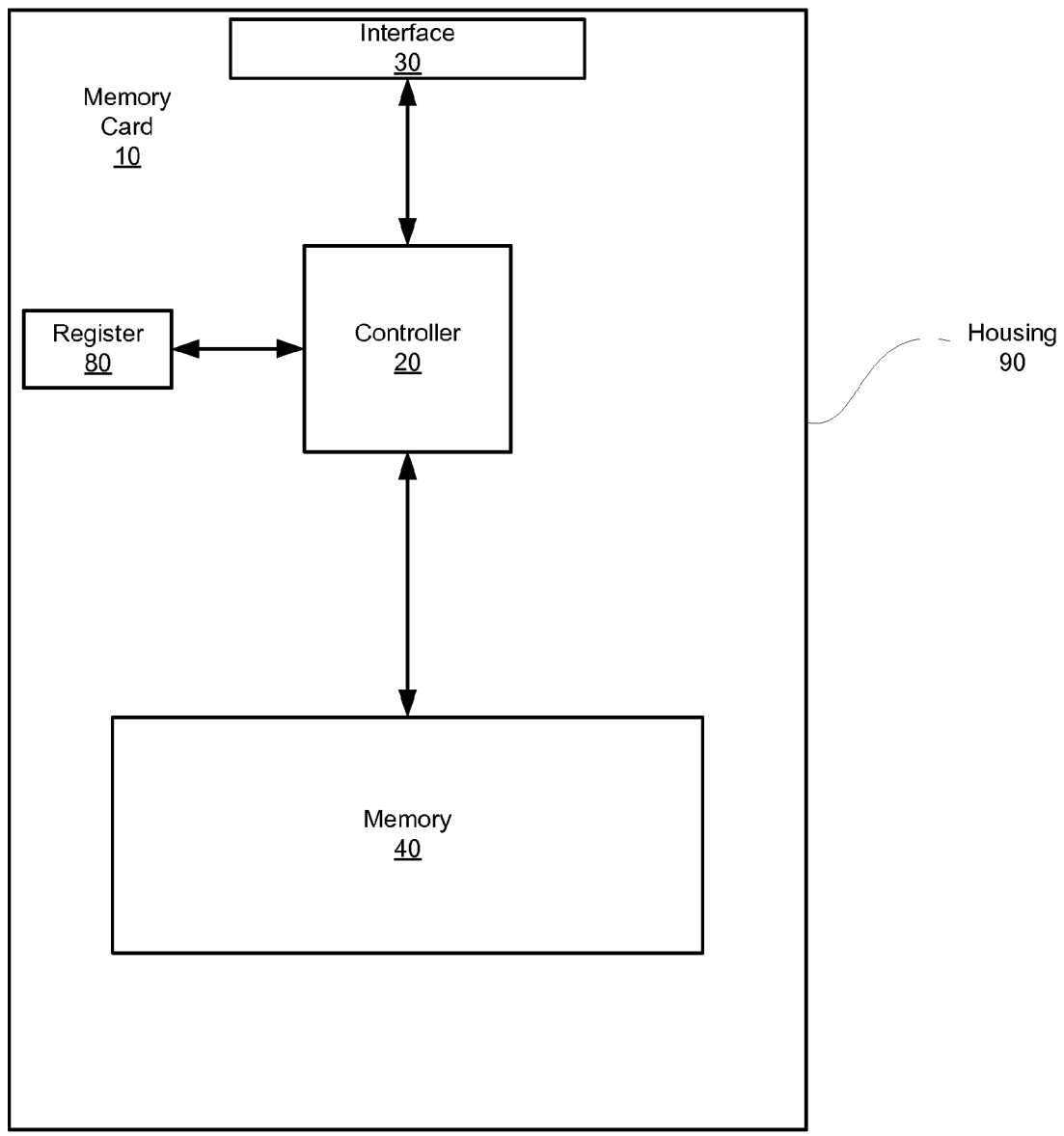
FIG. 1 is a logical block diagram of a memory card according to an embodiment of the present invention.

FIG. 1 illustrates a memory card 10 according to an embodiment of the present invention. The memory card includes a controller 20, which may be implemented by hardware or software, operable to communicate with a presentation device (not shown in FIG. 1) via an interface portion 30 that, in an embodiment, includes at least one contact pin known in the art.

The controller 20 is coupled to a memory portion 40. Depending on the nature of the memory portion 40, the card 10, in varying embodiments, may be characterized, for example, as a read-only memory (ROM) or Read/Write (e.g., flash) card.

The controller 20 is further coupled to an identification register 80 that stores a unique identification number, such as a manufacturer's serial or batch number (discussed below in greater detail), associated with the card 10. Each component of the card 10 is disposed within or on a housing 90.

Preferably, the card 10 is of a standard physical form factor used in many hardware devices such as cell phones, personal digital assistant devices, cameras, etc. As such, these hardware devices are enabled to read data off the card 10 because of existing industry input/output standards, such as the MMC form factor specified by the MMC association.

Prior to being loaded into the memory portion 40, a multimedia content file 50, such as, for example, an audio clip, video clip, or video game, is encoded and/or encrypted according to an appropriate scheme or schemes. For ease of discussion, the following exemplary description will assume that both encryption and encoding are applied to a given multimedia file, although embodiments of the present invention contemplate application of only one of encoding or encryption, as appropriate.

Figure 2:
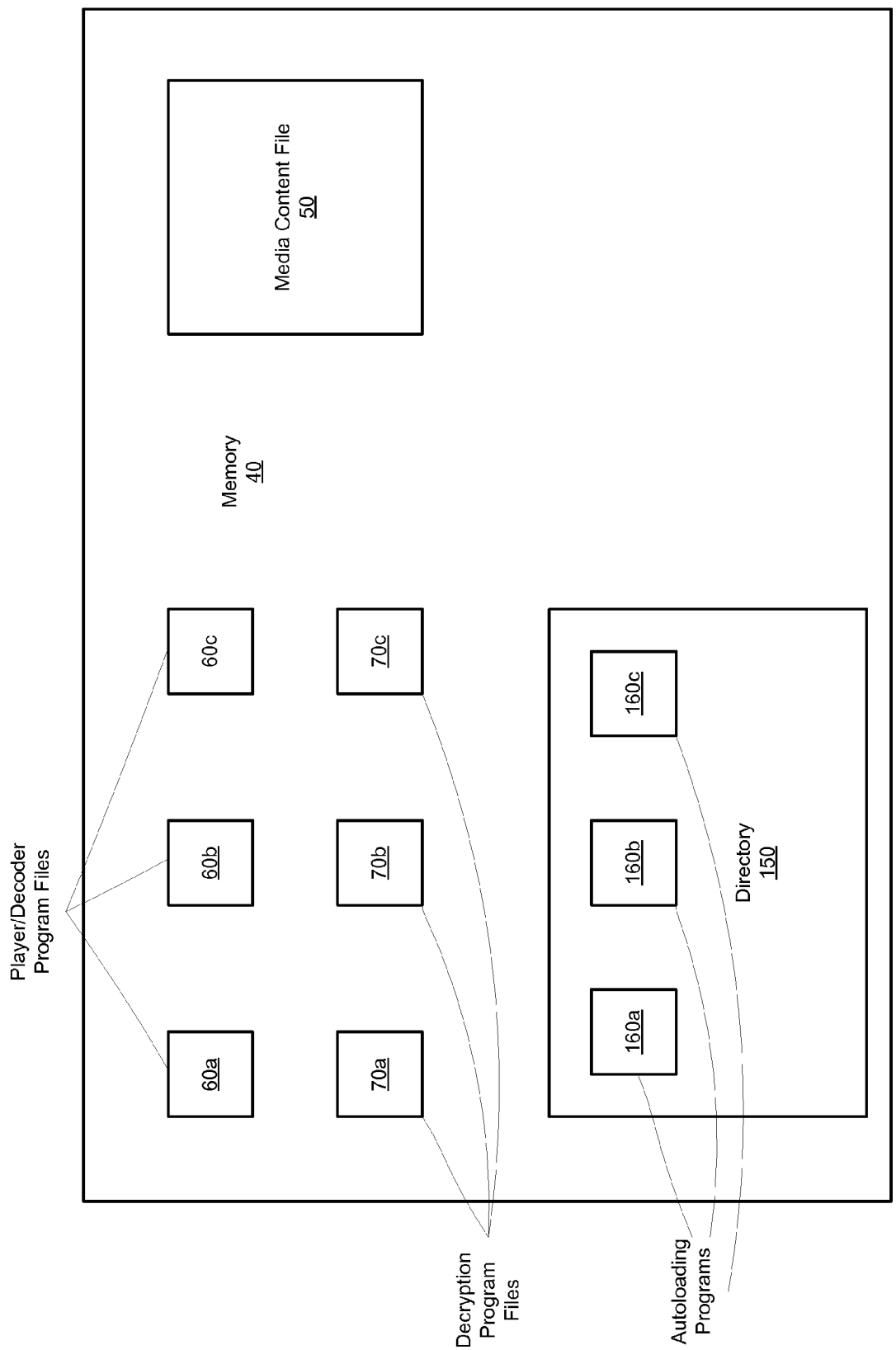
FIG. 2 is a logical block diagram of a memory portion of the card of FIG. 1 according to an embodiment of the present invention.

After being encoded and encrypted, the file 50, as illustrated in FIG. 2, is loaded into the memory portion 40. Also as illustrated in FIG. 2, a plurality of player/decoder program files 60a-60c and a plurality of decryption program files 70a-70c may also be loaded into the memory portion 40. In an alternative embodiment, the card may include a plurality of memory portions and the file 50 may be stored on a memory portion separate from the memory portion on which the programs 60, 70 are stored. Moreover, it should be appreciated that more than one file 50 and corresponding programs 60, 70 may be stored on a single card 10.

Each program 60a-60c is a different version of the same decoder software and is compatible with a respective different type of electronic system with which the card 10 may cooperate, and/or is compatible with a respective different operating system employable by an electronic system. Moreover, the decoder, of which each program 60a-60c is a different version, corresponds to the scheme used to encode the file 50, and is thus required in order to decode the file 50. Similarly, each program 70a-70c is a different version of the same decryption software and is compatible with a respective different type of electronic system with which the card 10 may cooperate, and/or is compatible with a respective different operating system employable by an electronic system. Moreover, the decryption software, of which each program 70a-70c is a different version, corresponds to the scheme used to encrypt the file 50, and is thus required in order to decrypt the file 50.

Although only three decoder/player programs 60a-60c and decryption programs 70a-70c are illustrated in FIG. 2, it should be appreciated that the number of decoder/player programs 60 and decryption programs 70 that the memory portion 40 may store is limited only by practicability. As such, the memory portion 40 may store decoder/player programs 60 and decryption programs 70 compatible with all commercially available handheld-device operating systems, enabling the card 10 to cooperate with a wide variety of devices equipped to present visual and/or auditory information.

The controller 20 may be employed to read and write content, such as the file 50, stored on the card 10. This controller 20 is useful because the applications envisioned for an embodiment of the card 10 may involve multiple read cycles (e.g., in the many thousands), and many fewer write cycles (e.g., of one to one hundred times). Such applications may further require reading and writing the identification number of the card 10 as the player/decoder program files 60 and/or decryption program files 70 are loaded on those cards 10 of the read/write type.

During manufacture of the card 10, the manufacturer assigns a code thereto. If the card 10 is rewritable, the card 10 typically is assigned an individual serial number code. If the card 10 is of the masked ROM type, the card 10 typically is given a batch code. Each of these codes may be stored in a register included in the card 10. During the process of loading the programs 60, 70 on a card 10, the manufacturer's code associated with that card 10 is linked to the file 50 and/or programs 60, 70 by associating the code with the file 50 and/or programs 60, 70. As such, and as further discussed below, if the code stored in a register of a card does not correspond to the code linked to the programs 60, 70 stored thereon, the programs 60, 70 will optionally decode, not decode and/or decrypt the content stored on the card. This feature of an embodiment of the invention serves to discourage unauthorized copying of programs 60, 70 and files 50 from card to card. In this manner, the card 10, itself, can perform the function of a dongle.

Figure 3:
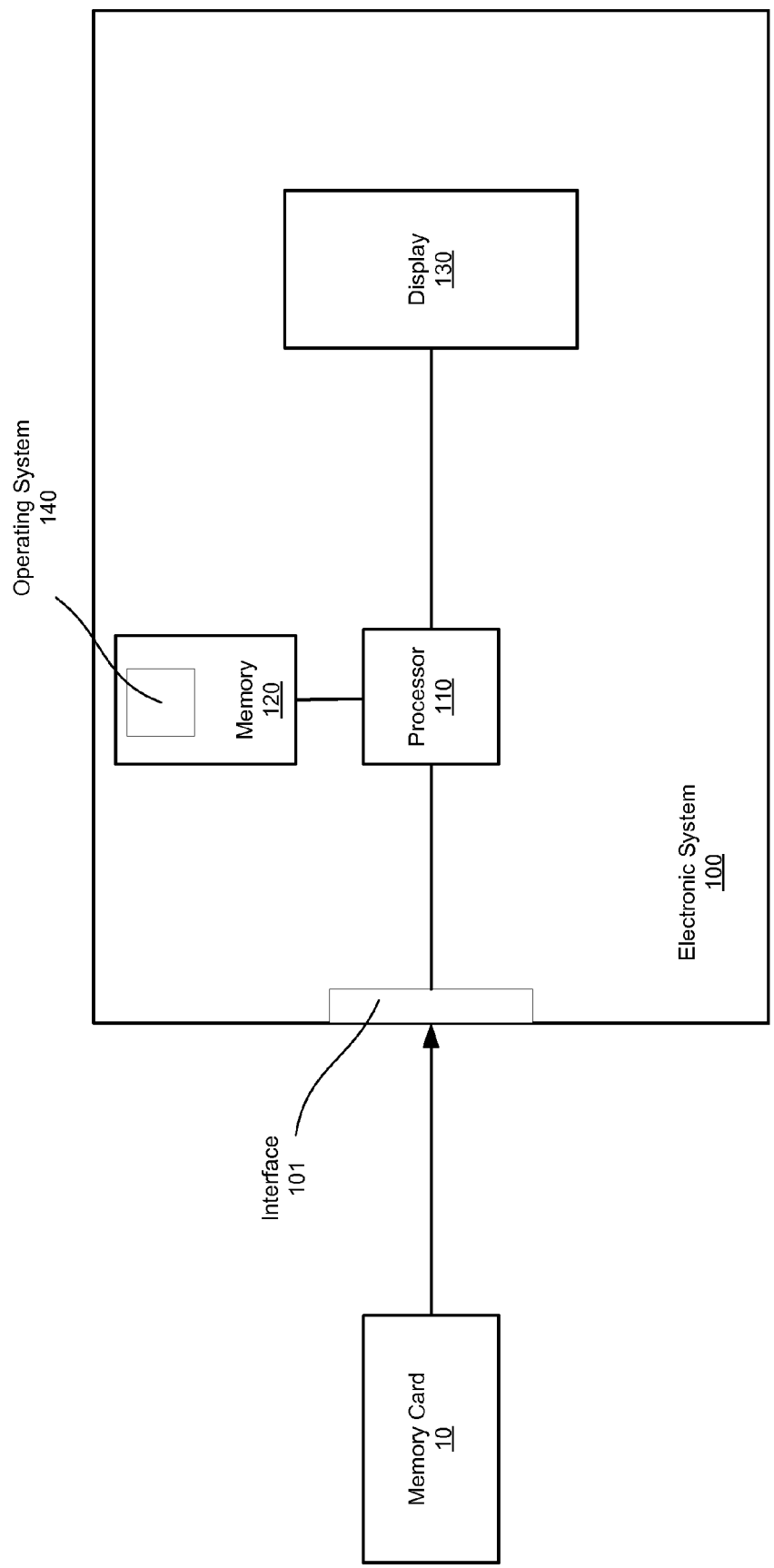
FIG. 3 is a logical block diagram of an electronic system operable to cooperate with the card of FIG. 1 according to an embodiment of the present invention.

FIG. 3 illustrates cooperation between the card 10 and an electronic system 100, such as a handheld device, according to an embodiment of the present invention. The card 10 may be physically coupled (e.g., docked) to the electronic system 100 by means of an interface 101. Optionally, the card 10 may be coupled to the electronic system 100 (associated) by means of a wireless interface 101. As such, the interface 101 is coupleable to each component of the card 10. The electronic system 100 may include a processor 110, a memory 120 and a display device 130, such as a liquid crystal display (LCD). An operating system (OS) 140, such as, for example, Palm OS®, Microsoft® Pocket PC, Symbian, or Linux, is stored in the memory 120.

Handheld device operating systems typically contain instructions enabling an inserted or associated memory card to run an autoexecute/autoload program on the device. According to an embodiment of the present invention, the card 10 is partially formatted using a file allocation table (FAT) format per the standard for an MMC card. Using this file format, a directory 150 (FIG. 2) is made and named for a host device (e.g., PocketPC 2577), such as the electronic system 100 with which the card 10 will cooperate. This directory 150 includes at least one autoloading program 160 compatible with the particular type of electronic system 100 and may include several programs 160, each of which may be compatible with a respective different electronic system 100 and/or operating system associated therewith.

In operation, according to an embodiment of the invention, a user of the electronic system 100 docks the card 10 with the interface 101. In such an embodiment, at least a portion of the housing 90 is receivable by the interface 101.

An autoloading program 160, compatible with the system 100 and executed by the processor 110, queries the register 80 in order to verify that the number stored therein matches the number associated with the file 50 and/or programs 60, 70 during the prior encoding and/or encryption of the file 50. Alternatively, the autoloading program 160 may be executed by the controller 20 in order to perform this verification function. If the numbers do not match, indicating that the contents of the memory 40 have been copied to the card 10 without authorization, the loading process is optionally halted. If, however, the numbers do match, the program 160 identifies at least one characteristic of the system 100, such as, for example, the type of operating system 140 employed by the system 100, and verifies desired read/write capabilities associated with the card 10.

The electronic system 100 may then present on the display 130 a menu (not shown) of multimedia content stored on the card 10 that may be available to the user. Using an input device, such as, for example, a stylus or cursor control, the user then selects the desired entertainment content for presentation.

A decoder program 60 and decryption program 70, each corresponding to the selected file 50 and the detected OS 140 and/or type of electronic system 100, are loaded into the memory 120 for execution by the processor 110. In turn, and in a known manner, execution of the programs 60 and 70 by the processor 110 produces a decoded and decrypted version of the file 50 for presentation to the user.

In an embodiment of the invention, the video and/or audio decoding algorithm 60 supplied with the file 50 may be an improved version that is less complex and may process information faster with higher throughput than the algorithms sometimes found on the existing electronic systems 100 themselves (i.e., an originally installed decoder, if any). The supplied algorithm 60 may have a higher video throughput than the algorithm on the electronic system 100.

In an embodiment, the decoder/player programs 60 and decryption programs 70 are stored from the card 10 into the memory 120 of the electronic system 100 during operation, and thus do not go through a formal program install. As such, the programs 60, 70 disappear from the memory 120 when the player/decoding and/or decryption process is terminated/completed or the card 10 removed. The OS 140 of the electronic system 100 allocates the used program memory back into a scratch pool on completion. As such, the decoder/player programs 60 and decryption programs 70 are not accessible to all but the most sophisticated programmers for copying. This feature is advantageous in that it makes consumer pirating of the content file 50 more difficult.

In an embodiment of the invention, the decoder program 60 will function as a "rolling" decoder. This means that when the file 50 is compressed it will be so with a unique code-table format. The code-table format is changed with respect to each file 50 compressed. There may be a finite set of different code tables (e.g., 128), each set up for a particular version of the decoder program 60. Consequently, only a particular decoder program 60 that is loaded on a card 10 can be used to decompress an associated file 50 stored on the card 10. As such, each compression format serves as a form of encryption and the decoder program 60 serves as the key.

Similarly, a rolling decrypter may be employed in an embodiment of the invention. In a rolling decrypter implementation, the physical encryption process is changed with respect to each file 50 encrypted. This is alternatively or additionally implemented by interchanging data fields within the compressed data in a random or approximately random pattern specified by a key that is used by the decrypter program to place data fields in the correct order.

In an embodiment of the present invention, protection of content is achieved through the use of systematically or randomly encrypted occasional bytes. This is useful because decryption of all content, decoder, or controller software requires significant processor power. For example, if video content is encrypted, the processor power required for decoding is significant. An embodiment of the present invention includes encrypting only occasional pieces of the file 50 that the decoder and or player-decoder code recognizes (hidden message) in order to play the following frame/short audio/video sequence correctly.

This encryption is thus, in an embodiment, a multi-level multi-key encryption (rolling decoder feature) comprising a 1st level "soft" encryption that is done to all bits of digital content and a 2nd level "hard" encryption done to selected portions of the file 50 (e.g. select bytes of video key-frames). This method reduces processing overhead and lowers the impact of decryption on playback efficiency. This method further makes a user's playback of any straight (undecrypted) content impossible. Attempts by a user to play back content without the rolling decoder player program will not yield playback.

In an embodiment, rather than use a single key, a set of keys is used to encrypt/decrypt each content file 50. An algorithm is used to select the correct key from the set at any given time. Further, using multiple keys increases the difficulty in reverse engineering the encryption algorithm.

Another benefit of this on-the-fly decryption is that the entire file 50 is never decrypted at once into memory 120 and can thus not be copied easily by a user into another unencrypted file for subsequent non-encrypted playback.

The rolling decoder is separate from 128-bit rolling encryption/decryption and also watermarking technologies already developed and in the public domain and which may, in an embodiment, also be utilized. To illustrate, the decoder for video "A" on one card production run would not decode the video on the video "B" card run even assuming that the encryption was broken. This is because the key set and/or encryption technique and content encoder algorithm are changeable for each released card product through the concept of the rolling decoder. This is possible since each product is shipped with a matching player program in binary form on the same card. This technique reduces the impact of unauthorized acquisition or discovery of a previous card's key set or content encoder algorithm.

In varying embodiments, the above-discussed encryption and/or digital rights methods can be used in combination or alone.

Rewritable storage cards can be written to multiple times (100,000 to 1 million) before they will fail. In a "write once" or "write multiple" card, a controller circuit within the card restricts the writing to one time or a few times (i.e., 2 to 100,000) only. In a masked memory card, the data is etched into the memory at the manufacturing site and write circuitry is not provided.

Where a write once controller circuit is used, the controller circuit restricts the writing to only once. There are controller circuits that count the write cycles and limit them to a particular number. MMC cards of this class are utilized in an embodiment of the present invention.

In contrast, as an example, one can write present-day flash memory many times, almost without limit, and the controller circuit allows this functionality. Out of every batch of flash memory that should allow tens of thousands of rewrites, there is defective memory produced that can be written to only 1000 times or fewer. This memory is typically considered defective and thrown away. As such this lower-capability memory is available at a lower cost than the fully capable memory. An embodiment of the present invention uses these lower-capability flash memory cards to reduce cost. In this case, the controller circuit is implemented as a processor 20 executing a program adjusted to limit the number of times that the card 10 can be written.

An embodiment of the present invention employs a controller program or circuit 20 that utilizes memory 40 capable of only a limited number of write operations otherwise considered defective because the memory 40 can only accept a limited number of write cycles or has a low write-data rate.

The feature of the card 10 capable of more than one write operation is particularly useful to video and audio content vendors. For example, in the music business, when some audio, or alternatively video cards don't sell, the cards can be returned by the distributor or retailer for re-loading of a file 50 and decoder 60 with an alternative, preferably a newer, more saleable, set of audio or video tracks with decoder. For these cards returned for reprocessing, new content loading can be used to put a different, likely newer song or video on the same card. This reprocessing and reloading of additional and/or essentially different content and decoder allows vendors and distributors to reuse the cards 10 to lower their costs.

The feature of a controller 20 that allows only a limited number of write operations is further useful because a limited write capability is part of the digital rights management strategy of industries such as music, video, gaming, etc. Compliance with the digital rights management strategy of these industries may be accomplished by placing a third software component on the card 10. This software is called content protection software (CPS). It is placed on the card 10 so people cannot easily copy the content in a first card to a second card and have the content play correctly from the second card.

One function of the CPS is that it is self-enabled to detect that it has been placed on a flash memory card (a card capable of multiple writes). When this state is detected by the CPS code, the CPS code may interact with the content decoder program such that the card content is prevented from playing on a hardware device.

With reference to video encoding, the well-known Sissler Video Correction Fully Automatic Encoding Algorithm (SVCFAEA) takes the raw video and makes it easier to encode using motion blur technologies. With SVCFAEA, if there is not enough power in the computer to process the video playback at full frame speed, then the video content is modified so it visually looks nearly the same and yet takes less memory and can be decoded at visually pleasing speeds. In an embodiment of the present invention, the SVCFAEA algorithm is used to modify the file 50 to be loaded on the card 10 by using a series of varying filters. These filters are applied by measurement of the amount of quantitization to be retained in the file 50. This process is designed to reduce the data rate required of the decoder such that frames are not dropped by the decoder during the decoding operation. The SVCFAEA process is particularly useful as it is an automated manufacturing process as opposed to a manual process. This reduces the cost of manufacture of the files 50.

Preparation of a card 10 carrying a file 50 may be achieved, in an embodiment, in a particular manner. An application is assessed to determine the appropriate type of storage card (e.g., flash or read only). A permutation of a rolling decoder may be selected. Audio/video in digital form accessible to a PC workstation may be obtained. The Video may be preprocessed to acceptable dimensions. Nominally this may be 240 lines by 320 pixels. The frame rate may be reduced to one half of the original with a target of 15-20 frames per second. The complexity of the video may be assessed with respect to both intra-frame detail and inter-frame motion. Frame-by-frame filtering may be performed where deemed appropriate. Brightness may be adjusted by computing the histogram of the luma pixels and adding sufficient bias to each pixel such that no more than 5%, for example, of all luma pixels are above a nominal saturation level. The audio/video sequence may be encoded with rate control imposed. The average required quantization levels may be recorded. Periods of heavy quantization (combining of individual data items into fewer data items to reduce heavy decoding requirements)

may be ascertained. These may be candidate areas for further filtering. The encoded data may be transferred to a test card with an embedded AC player program. Using a handheld device, the video may be played. The complete video may be monitored, paying particular attention to the heavily quantized areas, brightness saturation and audio quality. Parameters may be readjusted and the coding/testing process from above may be repeated.

It should be appreciated that implementations of embodiments described herein need not be limited to memory storage cards. For example, embodiments of the invention may be realized in the use of compact discs (CDs), digital video discs (DVDs), any flash or read only (non-volatile memory), floppy disks, Flash Drives, smart cards or any storage media that supports digital storage. Consequently, the electronic storage system 100 may alternatively include personal computers, workstations, or any other device operable to process digital media.

It should further be appreciated that an embodiment of the invention may be achieved by modulating a signal to carry the multimedia file 50, along with the player/decoder and/or decryption programs required to process the file.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. An article of manufacture, comprising:
 a machine-readable storage medium having stored thereon:
  a multimedia content file in a first format;
  a plurality of distinct program sets,
 wherein each program set is a version of software that, when executed by a respective electronic system, produces the multimedia content file in a second format for use in the respective electronic system, the use in the respective electronic system including displaying content in the multimedia content file on a display of the respective electronic system,
 wherein the plurality of program sets include a first program set executable by a first processor in a first electronic system utilizing a first operating system, and a second program set that is distinct from the first program set and that is executable by a second processor in a second electronic system utilizing a second operating system that is distinct from the first operating system.

2. The article of manufacture of claim 1, wherein each program set of the plurality of program sets corresponds to a distinct respective operating system and is executable by a processor that also executes the distinct respective operating system.

3. The article of manufacture of claim 2, wherein each program set of the plurality of program sets includes decoder software and decryption software for decoding and decrypting the multimedia content file.

4. The article of manufacture of claim 2, wherein each program set of the plurality of program sets includes a respective autoload program that is executable by the processor that also executes the respective operating system.

5. The article of manufacture of claim 2, wherein the respective electronic system is a handheld electronic device.

6. The article of manufacture of claim 2, wherein the respective electronic system is a handheld electronic device having a wireless interface and a display.

7. The article of manufacture of claim 1, wherein the respective electronic system is a handheld electronic device.

8. The article of manufacture of claim 1, wherein the respective electronic system is a handheld electronic device having a wireless interface and a display.

9. The article of manufacture of claim 1, wherein each program set of the plurality of program sets includes decoder software and decryption software for decoding and decrypting the multimedia content file.

10. The article of manufacture of claim 1, wherein the first one of the plurality of program sets includes a first autoload program compatible with the first operating system and the second one of the plurality of program sets includes a second autoload program compatible with the second operating system.

11. A first electronic system, comprising:
 a first processor;
 memory coupled to the first processor;
 software, comprising a first operating system, stored in the memory and executable by the first processor;
 a display; and
 a removable memory device, coupled to the processor by an interface, the removable memory device having stored thereon:
  a multimedia content file in a first format, the multimedia content file including content to be displayed on the display; and
  a plurality of distinct program sets, wherein each program set is a version of software that, when executed by a respective electronic system, produces the multimedia content file in a second format for use in the respective electronic system, wherein the plurality of program sets include a first program set executable by the first processor in conjunction with the first operating system, and a second program set executable by a second processor in conjunction with a second operating system that is distinct from the first operating system;
 wherein the second processor is in a second electronic system that is distinct from the first electronic system, and the second program set is distinct from the first program set; and
 wherein the first program set, when executed by the first processor in the first electronic system, produces the multimedia content file in the second format for use in the first electronic system; and
 wherein the second program set, when executed by the second processor in the second electronic system, produces the multimedia content file in the second format for use in the second electronic system.

12. The first electronic system of claim 11, wherein each program set of the plurality of program sets corresponds to a distinct respective operating system and is executable by a respective processor that also executes the distinct respective operating system.

13. The first electronic system of claim 12, wherein each program set of the plurality of program sets includes decoder software and decryption software for decoding and decrypting the multimedia content file.

14. The first electronic system of claim 12, wherein each program set of the plurality of program sets includes a respective autoload program that is executable by the respective processor that also executes the respective operating system.

15. The first electronic system of claim 12, wherein the first electronic system is a handheld electronic device.

16. The first electronic system of claim 12, wherein the first electronic system is a handheld electronic device having a wireless interface and a display.

17. The first electronic system of claim 11, wherein the first electronic system is a handheld electronic device.

18. The first electronic system of claim 11, wherein the first electronic system is a handheld electronic device having a wireless interface and a display.

19. The first electronic system of claim 11, wherein each program set of the plurality of program sets includes decoder software and decryption software for decoding and decrypting the multimedia content file.

20. The first electronic system of claim 11, wherein the first program set includes a first autoload program compatible with the first operating system and the second program set includes a second autoload program compatible with the second operating system.

21. A method of operating an electronic system having a processor and memory storing operating system software that is executable by the processor, the method comprising:
receiving a removable memory device at an interface, the removable memory device having stored thereon:
a multimedia content file in a first format; and
a plurality of distinct program sets, wherein each program set is a version of software that, when executed by a respective system, produces the multimedia content file in a second format for use in the respective system, wherein first and second ones of the program sets are compatible with distinct first and second operating systems executed by respective first and second electronic systems; and
executing one of the program sets, in conjunction with the operating system software, to produce the multimedia content file in the second format for use in the electronic system.

22. The method of claim 21, wherein each program set of the plurality of program sets corresponds to a distinct respective operating system and is executable by a respective processor that also executes the distinct respective operating system.

23. The method of claim 22, wherein each program set of the plurality of program sets includes decoder software and decryption software for decoding and decrypting the multimedia content file.

24. The method of claim 23, wherein:
a first code associated with the removable memory device is stored on the removable memory device, separate from the multimedia content file and the plurality of program sets;
a second code is stored in the multimedia content file or the plurality of program sets; and
executing one of the program sets includes comparing the first code to the second code.

25. The method of claim 24, including preventing execution of at least one of the decoder software and decryption software if the first code does not match the second code.

26. The article of manufacture of claim 1, wherein the machine-readable storage medium is adapted to be coupled to the respective electronic system and is removable from the respective electronic system.

27. The article of manufacture of claim 1, wherein the machine-readable storage medium is nonvolatile.

28. The first electronic system of claim 11, wherein the removable memory device is a nonvolatile memory device.

29. The method of claim 21, wherein the removable memory device is a nonvolatile memory device.

* * * * *